(12) United States Patent
Booth (10) Patent No.: US 8,409,442 B2
(45) Date of Patent: Apr. 2, 2013

(54) WATER SEPARATION METHOD AND APPARATUS

(75) Inventor: Donald W. Booth, Charleston, WV (US)

(73) Assignee: NG Innovations, Inc., Cross Lanes, WV (US)

( * ) Notice: Subject to any disclaimer, the term of this patent is extended or adjusted under 35 U.S.C. 154(b) by 410 days.

(21) Appl. No.: 12/771,658

(22) Filed: Apr. 30, 2010

(65) Prior Publication Data

US 2011/0046787 A1 Feb. 24, 2011

Related U.S. Application Data

(60) Provisional application No. 61/235,514, filed on Aug. 20, 2009.

(51) Int. Cl.
*B01D 61/22* (2006.01)

(52) U.S. Cl. .. 210/650; 210/96.2; 210/101; 210/170.07; 210/259; 210/652; 210/739; 210/747.7; 210/806

(58) Field of Classification Search ............ 166/250.01, 166/250.1, 265, 266, 267, 308.1; 175/65–67, 175/206, 207; 210/85, 96.2, 101, 102, 130, 210/143, 170.01, 321.6, 335, 259, 241, 650, 210/747.1, 747.3, 747.7, 806, 170.07, 652

See application file for complete search history.

(56) References Cited

U.S. PATENT DOCUMENTS

| | | | | |
|---|---|---|---|---|
| 2,407,180 | A | * | 9/1946 | Shapiro et al. ............... 210/660 |
| 4,026,791 | B1 | | 5/1977 | Wallace |
| 4,324,292 | B1 | | 4/1982 | Jacobs et al. |
| 4,366,063 | A | * | 12/1982 | O'Connor .................... 210/652 |
| 4,495,056 | B1 | | 1/1985 | Venardos et al. |
| 4,560,812 | B1 | | 12/1985 | Blytas |
| 4,752,399 | B1 | | 6/1988 | Viator et al. |
| 4,765,910 | A | | 8/1988 | Wolf |
| 4,895,665 | B1 | | 1/1990 | Colelli et al. |
| 4,950,311 | B1 | | 8/1990 | White, Jr. |
| 4,994,169 | B1 | | 2/1991 | Godino et al. |
| 5,132,025 | B1 | | 7/1992 | Hays |
| 5,156,706 | A | | 10/1992 | Sephton |
| 5,422,012 | B1 | | 6/1995 | Adams |
| 5,558,775 | A | * | 9/1996 | Busch, Jr. .................... 210/638 |
| 5,741,416 | A | * | 4/1998 | Tempest, Jr. .................. 210/90 |
| 5,895,565 | A | | 4/1999 | Steininger et al. |
| 5,986,133 | B1 | | 11/1999 | Holtzapple et al. |
| 6,162,361 | A | * | 12/2000 | Adiga ........................... 210/652 |
| 6,340,373 | B1 | | 1/2002 | Billington |

(Continued)

FOREIGN PATENT DOCUMENTS

EP 0936344 A2 8/1999

*Primary Examiner* — Joseph Drodge
(74) *Attorney, Agent, or Firm* — Dinsmore & Shohl LLP; Monika J. Hussell, Esq.

(57) ABSTRACT

A system for treating fractionated water from an oil and gas well. The system comprising a filter system, a diffusive membrane system, a plurality of membrane sensors, and at least one membrane controller. The filter system is fluidly connected to the diffusive membrane system, wherein the filter system comprises a plurality of straining filter banks. The diffusive membrane system comprises a plurality of membrane banks each having an inlet and an outlet. The plurality of membrane sensors are positioned at the outlet of each of the plurality of membrane banks, and the plurality of membrane sensors are configured to detect the total dissolved solids level at the outlet of each of the plurality of membrane banks. The at least one membrane controller is programmed to selectively disengage and isolate at least one of the plurality of membrane banks from fluid communication with the system upon detection if the total dissolved solids level at the outlet of one or more of the membrane banks is above about 20,000 ppm. A method is also provided.

18 Claims, 7 Drawing Sheets

U.S. PATENT DOCUMENTS

| | | | |
|---|---|---|---|
| 6,416,668 B1 * | 7/2002 | Al-Samadi | 210/636 |
| 6,508,916 B1 | 1/2003 | Razzaghi et al. | |
| 6,536,523 B1 | 3/2003 | Kresnyak et al. | |
| 6,673,249 B2 | 1/2004 | Max | |
| 6,730,234 B2 | 5/2004 | Symens | |
| 6,762,154 B2 | 7/2004 | Lungwitz et al. | |
| 6,984,292 B2 | 1/2006 | Kresnyak et al. | |
| 7,311,145 B2 | 12/2007 | Lehman et al. | |
| 7,331,389 B2 | 2/2008 | Lehman et al. | |
| 7,416,668 B1 | 8/2008 | Theodore | |
| 7,429,332 B2 | 9/2008 | Surjaatmadja et al. | |
| 7,510,656 B2 | 3/2009 | Shafer et al. | |
| 7,622,044 B2 | 11/2009 | Grott | |
| 7,824,552 B2 * | 11/2010 | Slabaugh et al. | 210/709 |
| 8,137,539 B2 * | 3/2012 | Gilron et al. | 210/96.2 |
| 2002/0134550 A1 | 9/2002 | Leeson et al. | |
| 2003/0164235 A1 | 9/2003 | Leeson et al. | |
| 2003/0168410 A1 | 9/2003 | Robicheaux et al. | |
| 2004/0031743 A1 | 2/2004 | Roberts et al. | |
| 2004/0112836 A1 | 6/2004 | Manz et al. | |
| 2005/0016906 A1 * | 1/2005 | Gettman | 210/143 |
| 2005/0098504 A1 | 5/2005 | Manz et al. | |
| 2005/0176590 A1 * | 8/2005 | Lehman et al. | 507/209 |
| 2007/0051513 A1 | 3/2007 | Heins | |
| 2007/0056913 A1 | 3/2007 | Burt | |
| 2007/0102359 A1 | 5/2007 | Lombardi et al. | |
| 2007/0289904 A1 * | 12/2007 | Oklejas | 210/87 |
| 2008/0073200 A1 | 3/2008 | Godshall et al. | |
| 2008/0156709 A1 | 7/2008 | Johnson | |
| 2008/0237141 A1 | 10/2008 | Kerfoot | |
| 2008/0277318 A1 | 11/2008 | Bozak et al. | |
| 2009/0032446 A1 * | 2/2009 | Wiemers et al. | 210/85 |
| 2009/0050572 A1 | 2/2009 | McGuire et al. | |
| 2009/0082906 A1 | 3/2009 | Sanderson et al. | |
| 2009/0101572 A1 | 4/2009 | Sullivan et al. | |
| 2009/0166170 A1 | 7/2009 | Sun | |
| 2009/0230059 A1 | 9/2009 | McGuire et al. | |
| 2009/0236281 A1 | 9/2009 | Shafer et al. | |

* cited by examiner

WATER SEPARATION METHOD AND APPARATUS

CROSS-REFERENCE TO RELATED APPLICATIONS

This application claims the benefit of U.S. Provisional Application Ser. No. 61/235,514, filed Aug. 20, 2009.

TECHNICAL FIELD

The present disclosure relates generally to processes and apparatuses for water treatment of fractionated water, and specifically relates to a system and method to for the treatment of fractionated water that allows selective disengagement of at least one membrane bank.

BACKGROUND

Hydraulic fracturing is a process applied to drilled oil and gas well holes to improve the ability of fluids (such as oil and gas) to flow from the petroleum bearing formation to the drill hole. It involves injecting high pressure fracturing fluid into the rock formation with various additives, thereby causing the formation to fracture circumferentially away from the hole. During the fracturing process, the injected fracturing fluid is recovered, while the oil and gas flows from the rock formation into the drill hole and up to the well surface. The fracturing process is often necessary for economical well production.

The fractionation of water results from the fracturing process, specifically, the chemical additions that are typically used as part of the fracturing process. In the fracturing process, sand is forced under pressure into the cracks that are pressure induced into the oil or gas underground formation. The sand is carried deep into the cracks of the formation by a viscous gel. The gel is "broken" to allow the release of sand at the sand's point of furthest ingress into the formation crack. Typically, the breaking process is initiated by an enzyme breaker. Upon breaking, the fractionated water is removed from the well, and may be treated with one or more treatment methods.

Many oil and natural gas operations generate significant quantities of fractionated water, in addition to their desired hydrocarbon products. Typically, fractionated water is contaminated with significant concentrations of chemicals that require treatment before the water may be reused or discharged to the environment. Fractionated water may contain natural contaminants that are mixed with the water as a result of the fracturing process, such as hydrocarbons and inorganic salts. It may also contain synthetic contaminants, such as spent fracturing fluids including polymers and inorganic cross linking agents, polymer breaking agents, friction reduction chemicals, and lubricants. These synthetic contaminants, which are utilized in the drilling process, remain in the fractionated water upon extraction to the surface.

One method that has traditionally been used to treat fractionated water is placing it in large evaporation ponds to isolate the contaminants for later removal. However, the practice of discharging fractionated water to evaporation ponds has been recently identified as wasteful in regards to the potential benefits that might accrue from alternative uses of the water, and land.

Another disposal method that has been used for treatment of fractionated water is deep-well disposal. The advantage to deep-well disposal is that it does not waste valuable surface land area. However, deep-well disposal still results in wasting large quantities of fractionated water. Since water has become recognized as a valuable and limited resource, such wasting has become closely scrutinized. An additional disadvantage of deep-well disposal of production waters is the high cost to transport the water to the deep-well sites.

Because the limited petroleum product supply is predicted to continue, the oil and gas industry has determined that waste minimization and fractionated water treatment is the path to increased hydrocarbon production profitability and an improved social profile.

Many fractionated water treatment systems require a complete shutdown for periodic cleaning and maintenance. In addition, many fractionated water treatment systems are limited to producing a treated water stream having a certain range of total dissolved solids.

Accordingly, there remains a need for systems and methods to treat fractionated water that allow continuous production of a treated water stream with a total dissolved solids level suitable for a variety of well conditions.

SUMMARY

The present disclosure relates generally to processes and apparatuses for water separation.

According to one embodiment, a system for treating fractionated water from an oil and gas well. The system comprises a filter system, a diffusive membrane system, a plurality of membrane sensors, and at least one membrane controller. The filter system is fluidly connected to the diffusive membrane system, wherein the filter system comprises a plurality of straining filter banks. The diffusive membrane system comprises a plurality of membrane banks each having an inlet and an outlet. The plurality of membrane sensors are positioned at the outlet of each of the plurality of membrane banks, and the plurality of membrane sensors are configured to detect the total dissolved solids level at the outlet of each of the plurality of membrane banks. The at least one membrane controller is programmed to selectively disengage and isolate at least one of the plurality of membrane banks from fluid communication with the system upon detection if the total dissolved solids level at the outlet of one or more of the membrane banks is above about 20,000 ppm.

In accordance with another embodiment, a method of treating fractionated water from an oil and gas well, the method comprising providing a fractionated water stream produced via hydraulic fracturing of an oil and gas well. The method may also comprise straining the fractionated water stream with a plurality of straining filter banks and diffusing a filtered stream through a plurality of diffusive membrane banks. The method may also comprise detecting the total dissolved solids level at the outlet of each of the plurality of membrane banks using a membrane sensor, and selectively disengaging at least one of the plurality of membrane banks if the total dissolved solids level ranges from about 20,000 ppm to about 40,000 ppm to produce a blended water stream.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
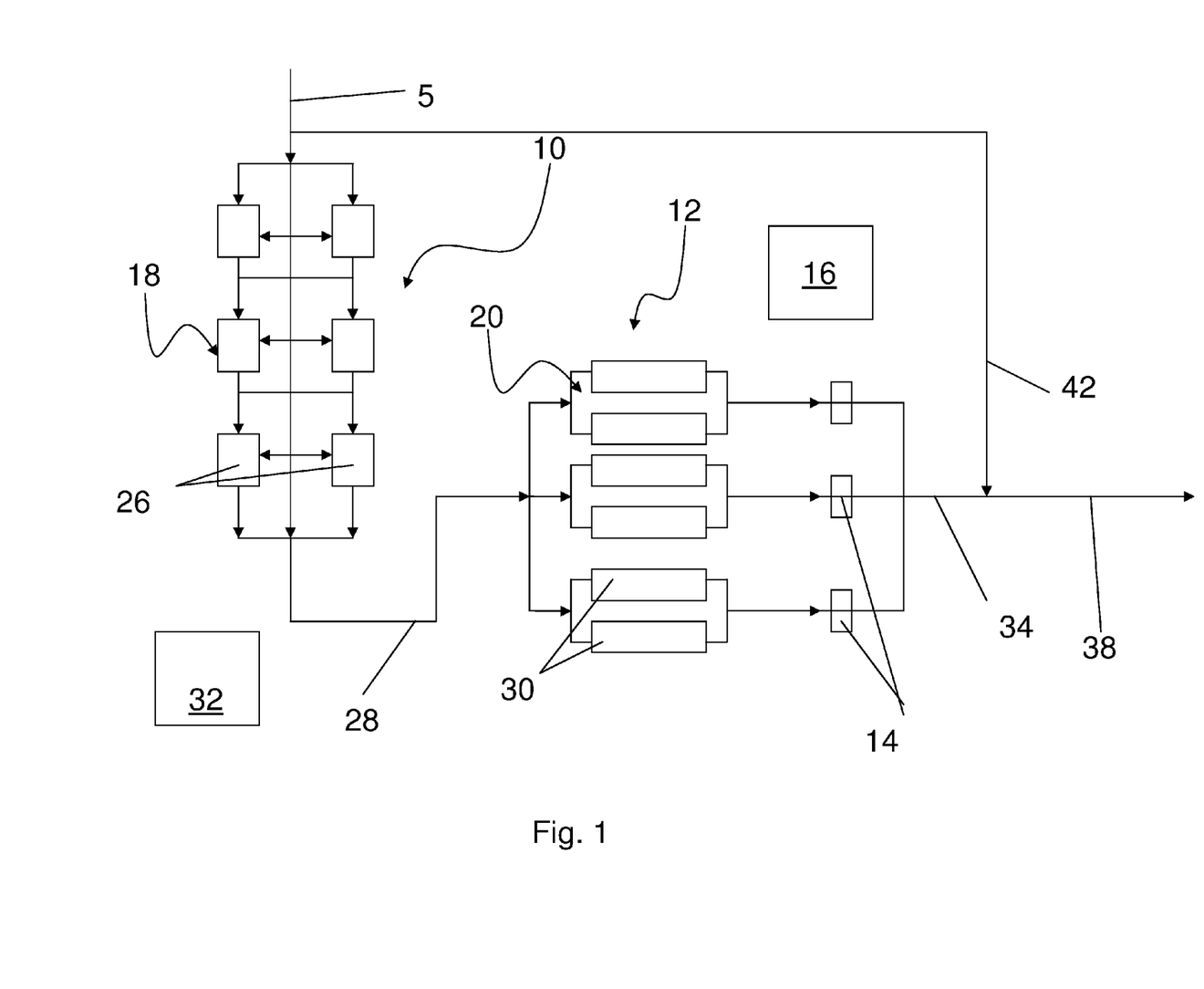
FIG. 1 shows a water treatment device in accordance with one embodiment.

Referring to FIG. 1, in accordance with one embodiment, a system for treating fractionated water 5 is provided. The system may comprise a filtration system 10, a diffusive membrane system 12, a plurality of membrane sensors 14, and at least one membrane controller 16. The filtration system 10 may be in fluid communication with the diffusive membrane system 12. In one embodiment, the filtration system 10 may comprise a plurality of straining filter banks 18, each having an inlet and an outlet. In another embodiment, the diffusive membrane system 12 may comprise a plurality of membrane banks 20, each having an inlet and an outlet. The plurality of membrane sensors 14 may be positioned at the outlet of the plurality of membrane banks 20, and may be configured to detect the level of total dissolved solids present in the water. The membrane controller 16 may be programmed to selectively disengage and isolate at least one of the plurality of membrane banks 20 from the system.

In one embodiment, a fractionated water feed 5 may be provided. As stated above, the fractionated water feed 5 results from hydraulic fracturing of oil-gas wells. The fractionated water feed 5 may comprise various levels of dissolved solids. Fractionated water may contain natural contaminants that are mixed with the water as a result of the fracturing process, such as hydrocarbons and inorganic salts. It may also contain synthetic contaminants, such as spent fracturing fluids including polymers and inorganic cross linking agents, polymer breaking agents, friction reduction chemicals, and lubricants. In one or more embodiments, the fractionated water feed 5 comprises a total dissolved solids level ranging from about 30,000 ppm to about 100,000 ppm, or from about 40,000 to about 70,000 ppm, or from about 45,000 to about 55,000 ppm. However, it is also contemplated that the methods and systems disclosed herein may be used to treat fractionated water having other levels of total dissolved solids. The system may include sensors (not shown) configured to measure the levels of total dissolved solids of the fractionated water feed as it enters the system for processing.

Figure 2:
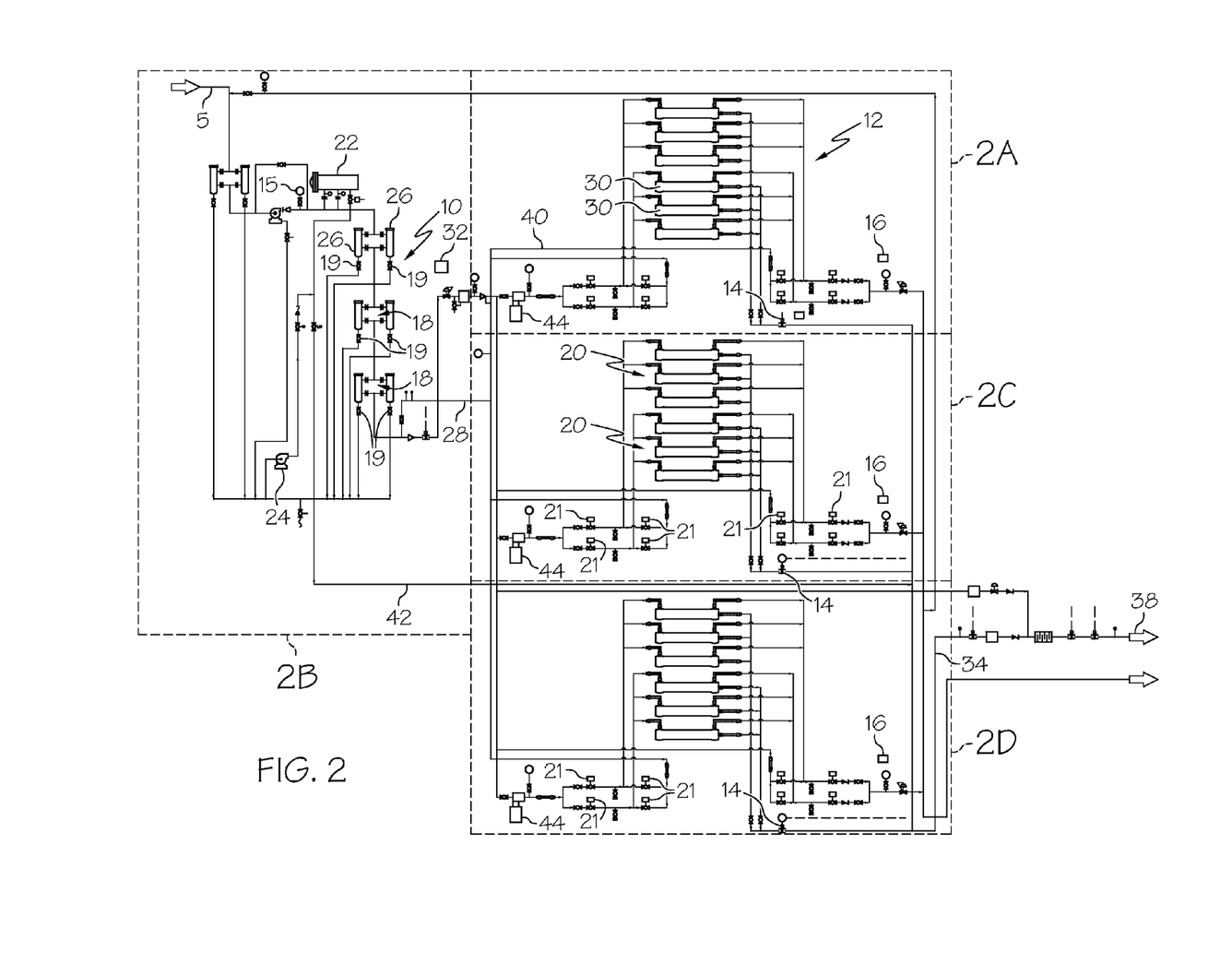
FIG. 2 shows an overview water treatment system in accordance with yet another embodiment.
Figure 2A:
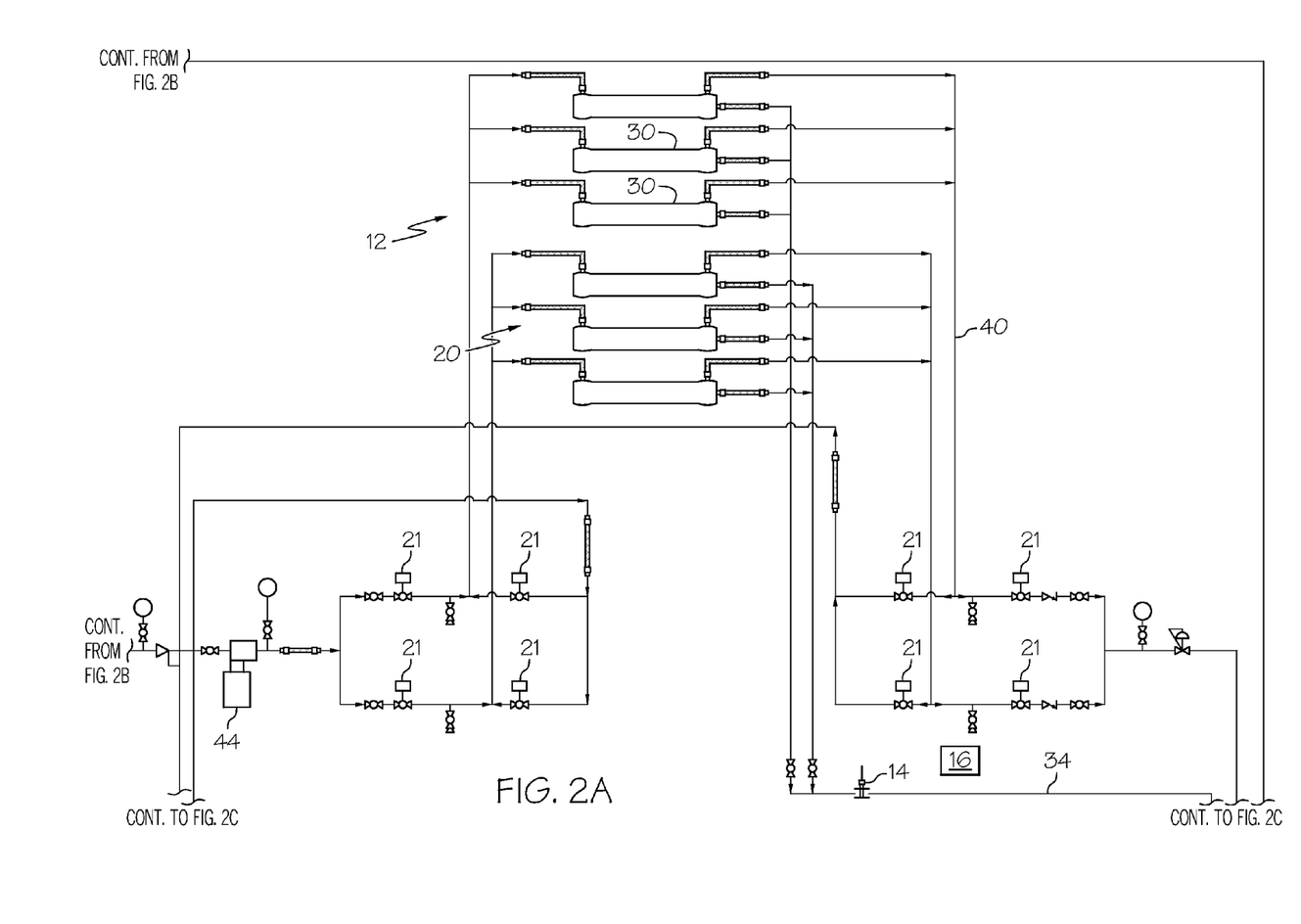
FIGS. 2A-D shows enlarged sectional views of the water treatment system of FIG. 2.

Referring to FIG. 2A, the system may comprise at least one pre-filter 22. The pre-filter 22 may remove large particles greater than 10 microns in size from the fractionated water feed 5. The pre-filter 22 may remove solids, such as iron, rock, sand, and oil from the fractionated water 5, before allowing the water to enter the filtration system 10. The pre-filter 22 may comprise a strainer, a bag filter, or other filter type configured to remove particles larger than about 5 microns, larger than about 10 microns, larger than about 15 microns, or larger than about 20 microns. It is also contemplated that the pre-filter 22 may comprise other devices known by those of ordinary skill to remove particles and contaminants from a fractionated water feed 5. Any number of pre-filters may be used in conjunction with the systems and methods disclosed herein, but however, in specific embodiments from 1 to 5 pre-filters may be used. The pre-filters may be arranged in series or parallel to one another. A pre-filter sensor 15 may also be provided in conjunction with the system to determine the level of total dissolved solids that are present in the outlet of the pre-filter. The system is also configured to provide a rinsing stream to backwash the pre-filter. The backwashing procedure may allow the removal of buildups and contaminants that impair the performance of the pre-filter. It is also contemplated, that the bypassing fractionated water may be provided after it is processed by the pre-filter.

The system may also comprise at least one filter pump 24 to pump the fractionated water feed 5 to the filtration system 10. The pump may be located on the suction side of the filtration system. While various pump capacities are contemplated, the filter pump 24 may have a capacity ranging from about 20 to about 200 gallons per minute (gpm). Alternatively, it is also contemplated that the filter pump 24 may have other capacities to suit the demands of the process and apparatus disclosed herein.

Referring again to FIGS. 2 & 2B, the filtration system 10 may comprise a plurality of straining filter banks 18 having an inlet and an outlet. The straining filter banks 18 may comprise a plurality of bag filters 26. However, other filter types may also be used, including but not limited to, mesh filters, strainers, ceramic filters, charcoal filters, and screen filters. The plurality of bag filters 26 may have filter dimensions operable to filter out any remaining solids and hydrocarbon droplets present in the fractionated water feed 5. The filter system 10 may strain out undesirable particles and contaminants from the fractionated water using size straining methods. In another configuration, it is contemplated that the filtration system comprises an alternative filter arrangement suitable to remove any remaining solids and hydrocarbon droplets. The filtration system 10 may receive the fractionated water feed 5 directly, or may receive the output of the pre-filter 22. Once the fractionated water feed passes through the plurality of straining filter banks 18, a filtered water stream 28 is produced. The filtered water 28 may be transferred to the diffusive membrane system 12 for further processing, or may be provided for use in other systems or devices.

Figure 2B:
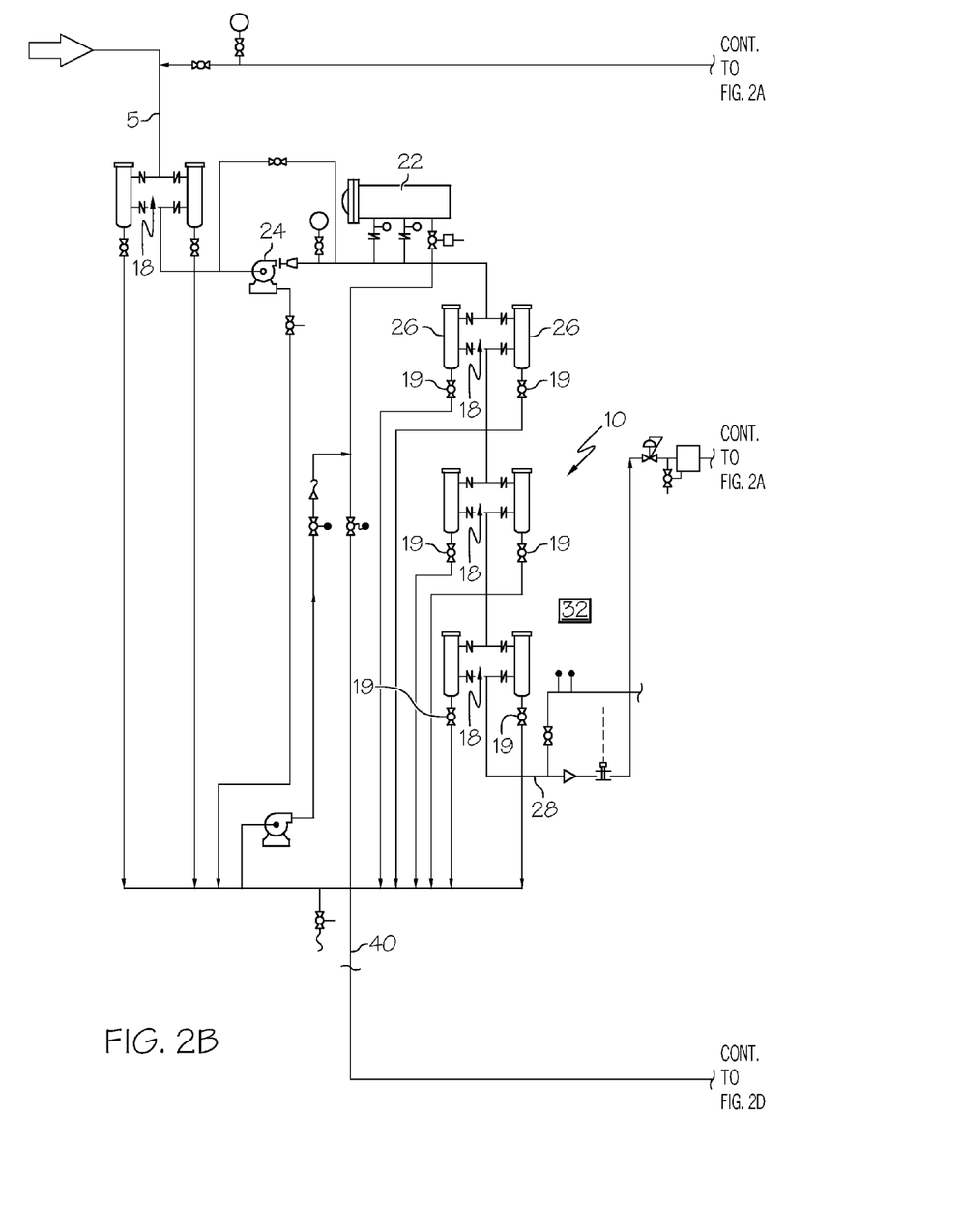

Referring to FIG. 2B, in one configuration, each of the straining filter banks 18 receives a portion of the fractionated water feed 5. The filtration system 10 may split the fractionated water feed 5 equally amongst the straining filter banks, or may split the fractionated water feed in other proportions amongst the plurality of straining filter banks. The filtration system 10 contains a plurality of filter valves 19 on the input and output of the straining filter banks 18. The plurality of valves may be configured to isolate any number of the plurality of straining filter banks from fluid communication with the remainder of the system. The plurality of valves may be in communication with the filter controller 32 and may be automatically engaged. The filter valves 19 may comprise mechanical, electromechanical, magnetic or other valve types that allow the control of the water flow. The filter valves are arranged and configured to limit or stop the flow of water entering each filter bank, or even the flow of water entering a particular filter within a filter bank, and preventing any fluid communication with the disengaged filter bank, or filter.

In one embodiment, the filtration system 10 may comprise a first straining filter bank, a second straining filter bank, and a third straining filter bank. Alternatively, the filtration system may comprise other numbers of straining filter banks. The first, second and third straining filter banks may comprise filters having pore sizes each progressively smaller than the straining filter bank upstream. In one embodiment, the bag filters may be manufactured by Rosedale. For example, the first straining filter bank may have a pore size of about 20 microns, the second filter may have a pore size of about 5 microns, and the third filter may have a pore size of about 1 micron.

In yet another embodiment, the plurality of straining filter banks comprise a first straining filter bank, a second straining filter bank, and a third straining filter bank. The first straining filter bank comprises a plurality of bag filters having a pore size ranging from about 15 microns to about 30 microns, wherein the second straining filter bank comprises a plurality of bag filters having a pore size ranging from above 0 microns to above 5 microns; and the third straining filter bank comprises a plurality of multiple layer bag filters having a pore size ranging from above 0 microns to above 5 microns, and wherein the first straining filter bank comprises an output fluidly connected to the second straining filter bank, wherein the second straining filter bank comprises an output fluidly connected to the third straining filter bank.

In a further embodiment, the plurality of straining filter banks comprise a first straining filter bank, a second straining filter bank, a third straining filter bank, and a fourth straining filter bank (not shown). The first straining filter bank may comprise a plurality of bag filters having a pore size ranging from about 15 microns to about 30 microns, or about 15 to about 25 microns, or about 15 to 20 microns. The second straining filter bank may comprise a plurality of bag filters having a pore size ranging from above 0 microns to about 5 microns, or about 5 microns or about 1 micron. The third straining filter bank may comprise a plurality of multiple layer bag filters having a pore size ranging from about 0 microns to about 5 microns or about 1 micron, or about 5 microns. The fourth straining filter bank may comprise a plurality of cartridge filters having a pore size ranging from above 0 microns to above 5 microns, or about 1 micron. In one possible configuration, the first, second, third, and fourth straining filter bank may be fluidly connected to each other in a progressive sequence starting from the first straining filter bank having the largest filter dimensions, and proceeding down in dimensions to the fourth straining filter bank having the smallest filter dimensions. However, it is also contemplated that the straining filter banks may be arranged in other fashions.

In another embodiment, the first straining filter bank may comprise a plurality of bag filters having a pore size of about 25 microns. The second straining filter bank comprises a plurality of bag filters having a pore size of about 5 microns. The third straining filter bank may comprise a plurality of multiple layer bag filters having a pore size of about 1 microns. The fourth straining filter bank may comprise a plurality of cartridge filters having a pore size of about 1 microns. Alternatively, the first, second and third filter banks may contain filters having a pore size of about the same size.

Referring again to FIG. 1, in another embodiment, the filtration system 10 may comprise a filter controller 32 programmed to selectively disengage and isolate at least one of the plurality of straining filter banks 18. The filter controller 32 may be used to control, monitor, and record the operation of the filtration system 10. The filtration system 10 may include a plurality of filter sensors 36 positioned at the output of each of the plurality of straining filter banks 18, operable to detect a level of total dissolved solids present in the water exiting each straining filter bank. The filter controller 32 may communicate with the plurality of filter sensors 36. If the filter controller 32 receives a signal that a particular straining filter bank is not functioning properly via the plurality of filter sensors 36, the filter controller may communicate with a series of filter valves 19 that may be engaged to isolate the targeted filter bank from fluid communication with the rest of the system. Once engaged, the contents of the filter bank may be prevented from contaminating the remainder of the water treatment system, and may be directed to a rinsing stream to conduct a backwash procedure on the entire filter bank, or a single filter within the filter bank. The filter sensors may comprise TDS sensors, optical sensors, density sensors, turbidity sensors, or other sensor types appreciated by one of ordinary skill suitable to detect the level of total dissolved solids. The filter controller 32 may comprise a PLC controller, coupled with a historian, and it may communicate with the plurality of filter sensors.

In addition, the filter controller 32 may be programmed to periodically shut down at least one straining filter bank 18 and direct a rinsing stream (not shown) to the disengaged straining filter bank for cleaning and backwash procedures as will be understood by one of ordinary skill. It is also contemplated that other procedures may be automatically engaged upon periodic shut down of the straining filter banks.

In another possible configuration, the filter system 10 may comprise at least four straining filter banks 18. A filter controller may interact with a plurality of straining filter banks 18, and may be operable to shut down an individual filter in a particular filter bank. In one embodiment, the filter controller 32 may be programmed to selectively disengage at least one filter of the first straining filter bank, at least one filter of the second straining filter bank, at least one filter of the third straining filter bank, and at least one filter of the fourth straining filter bank. Alternatively, the filter controller 32 may be operable to shut down filters in only a selected number of straining filter banks. In addition, the filter controller 32 may be programmed to disengage all of the filters in a given straining filter bank 18. Accordingly, the filter controller may shut down entire straining filter banks or individual filters within a straining filter bank, such that full functionality of the filtration system remains intact even if a single filter is shut down. If a single filter is shut down within a filter bank, the rest of the water may be channeled to the other filters in the bank, so that water may continue to be processed in the progressive pore size arrangement.

Referring again to FIGS. 1 and 2, in one embodiment, the system may comprise a diffusive membrane system 12 having a plurality of membrane banks 20. The filtered water 28 may be split equally amongst the plurality of membrane banks. However, the filtered water 28 may also be distributed in other fashions amongst the plurality of membrane banks 20. In one configuration, the diffusive membrane system 12 may comprise a series of membrane valves 21 that is operable to disengage at least one of the membrane banks 20 from fluid communication with the remainder of the system. By diffusive, it is meant that water pass through the permeable membranes under principles of a diffusive mechanism that is dependent on solute concentration, pressure, water flux, and other variables.

Figure 2C:
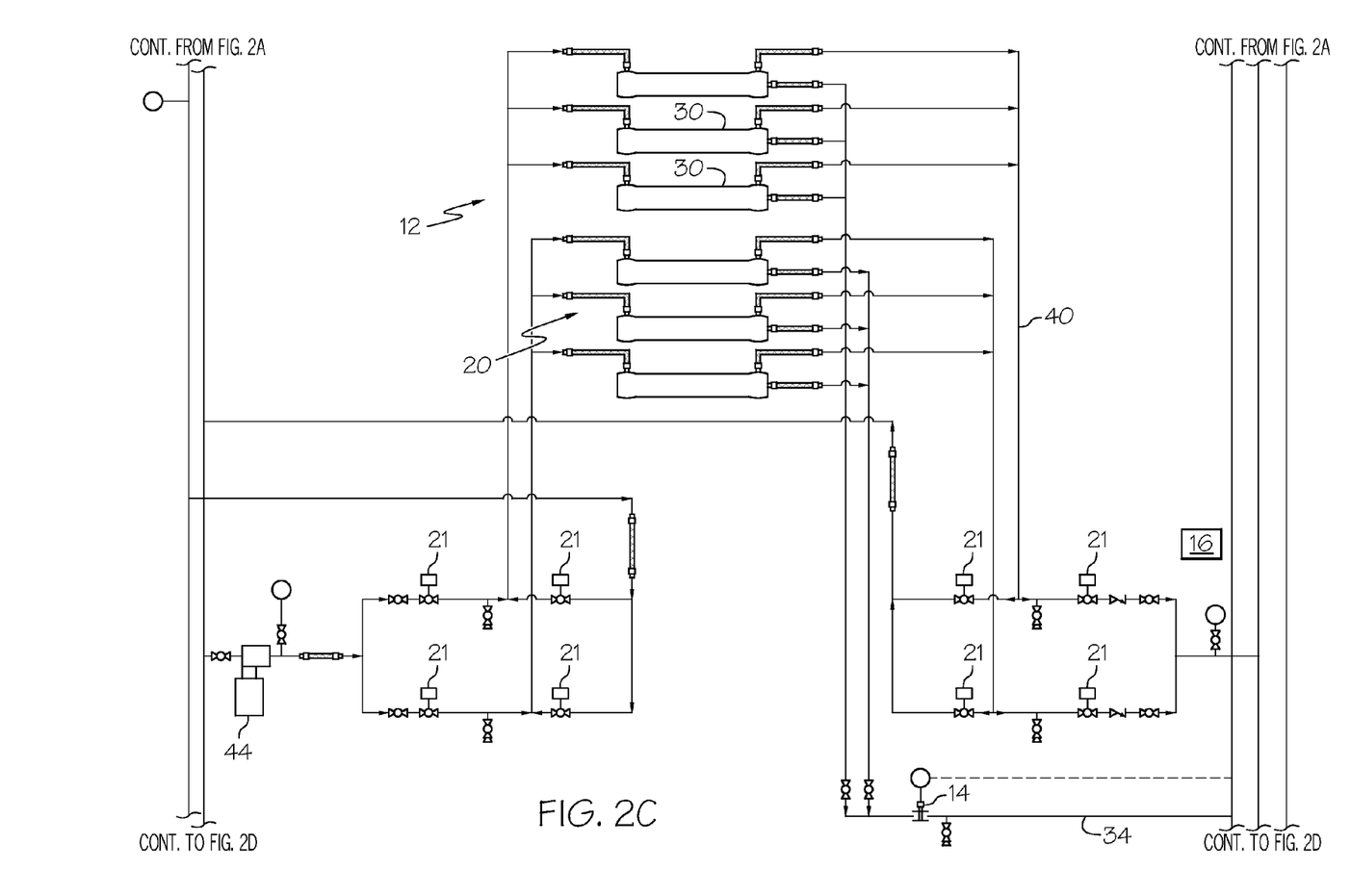
Figure 2D:
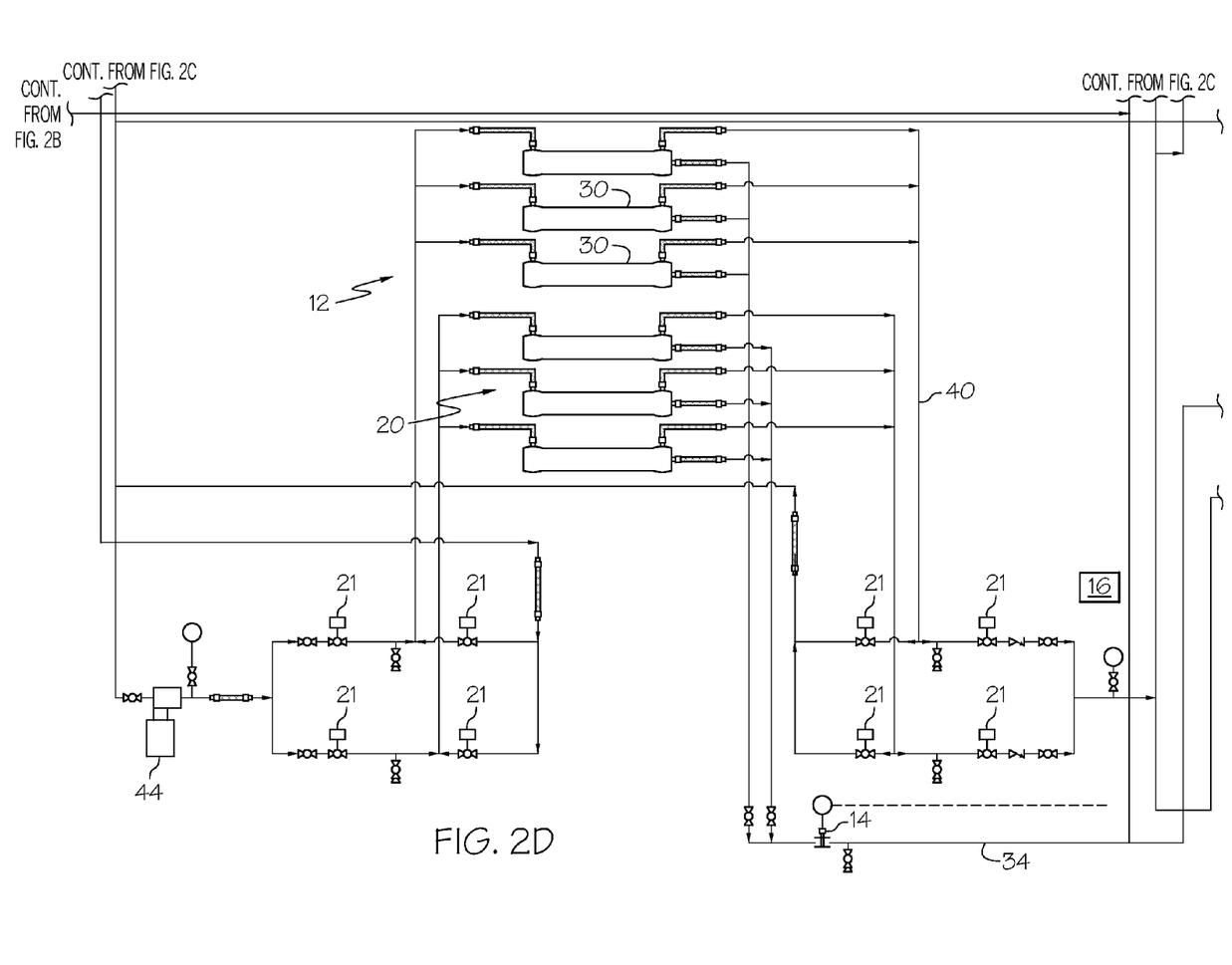

Referring to FIGS. 2A, 2C, and 2D, the diffusive membrane system 12 may comprise a number of membrane banks 20 ranging from about 2 to about 10 membrane banks. Alternatively, the diffusive membrane system may comprise a number of membrane banks ranging from about 3 to about 5 membrane banks. In addition, it is also contemplated the diffusive membrane system 12 may comprise other numbers of membrane banks sufficient to process the provided volume of filtered water, and produce the permeated water having the desired level of total dissolved solutes. It is contemplated that the diffusive membranes are sized in proportion to volume of filtered water to be processed.

The plurality of membrane banks 20 may comprise a plurality of diffusive membranes 30. In one configuration, the diffusive membranes may comprise a reverse osmosis membrane designed by Filmtec. One model that may be appropriate is the Reverse Osmosis SW30-4040, or the SW30 HRLE 4040. However, it is also contemplated that other reverse osmosis membranes may be used in conjunction with the membrane system disclosed herein. Each membrane bank 20 may have a common inlet and outlet, that connects the plurality of diffusive membranes in a parallel arrangement. The diffusive membranes 30 may be configured to separate contaminants from the filtered water 28 to produce a permeated water 34 having a total dissolved solids level ranging from about 5,000 ppm to about 50,000 ppm, or from about 10,000 to about 30,000 ppm, or from about 10,000 to about 20,000 ppm. The permeated water is the purified water stream that is produced by the plurality of membrane banks after the diffusion through the diffusive membrane takes place.

The diffusive membranes 30 may allow permeated water to pass through the diffusive membrane 30, while retaining any contaminants that are present in the filtered water 28. Each diffusive membrane 30 in the membrane bank may be similarly configured and sized.

The number of diffusive membranes 30 per membrane bank 20 may vary, depending on the needs of the particular application. In one configuration, each membrane bank 20 may comprise about 3 diffusive membranes 30. In another configuration, each membrane bank may comprise about 6 diffusive membranes 30. However, it is also contemplated that each membrane bank may comprise a number of diffusive membranes ranging from about 1 to about 10 diffusive membranes. The membrane banks may also comprise greater than 10 diffusive membranes per bank. The membrane banks may be arranged in a parallel fashion such that filtered water is split evenly amongst all of the membrane banks in the membrane system 12. Alternatively, the filtered water may be split in other proportions amongst the plurality of membrane banks.

Referring to FIG. 2, the diffusive membranes may be configured within the membrane banks 20 in a parallel fashion, such that as filtered water 28 enters the membrane bank, it is split evenly between each diffusive membrane in the membrane bank. Alternatively, it is also contemplated that the filtered water 28 is split unevenly amongst the diffusive membranes 30 disposed within the membrane bank.

The concentrate streams 40 produced by the plurality of membrane banks may be combined, and transferred to a concentrate storage tank (not shown) for additional treatment or disposal. The concentrate stream 40 may also be re-circulated through the filtration system 10 or diffusive membrane system, or both for additional processing. The concentrate stream 40 may be provided at about 60,000 ppm, or at about 80,000 ppm, or at about 90,000 ppm. The concentrate stream 40 may comprise all of the contaminants gathered by the diffusive membrane system through permeation.

The diffusive membrane system 12 may also comprise at least one membrane pump (not shown) operable to transfer water from the filtration system 10 through the diffusive membrane system 12. The diffusive membrane system 12 may include any number of membrane pumps. In one configuration, the number of membrane pumps is equal to about the number of membrane banks provided. Alternatively, the diffusive membrane system 12 may include more than one membrane bank per membrane pump. The membrane pumps (not shown) may be variable speed pumps, operable to control line pressure against back pressure of the membrane banks. A variety of pump types are contemplated, as will be appreciated by one of ordinary skill.

The diffusive membrane system 12 may comprise a plurality of membrane sensors 14 operable to determine the level of total dissolved solids exiting the plurality of membrane banks 20. The membrane sensors may be configured to measure the total dissolved solids levels of the fluid. A range of sensor types may be used to detect the total dissolved solids level as will be appreciated by one of ordinary skill. In one possible configuration, the plurality of membrane sensors 14 may be positioned at the outlet of the plurality of membrane banks 20. The membrane sensors 14 may also be positioned at the inlet of the plurality of membrane banks 20 to provide a differential measurement for each membrane bank. In addition, membrane sensors 14 may be positioned at the inlet and outlet of each diffusive membrane 30 within a membrane bank 20.

The diffusive membrane system may be configured to produce a permeated water stream having a total dissolved solutes level of less than 50,000. The permeated water stream 34 may have a concentration of total dissolved solids ranging from about 0 ppm to about 50,000 ppm, or from about 10,000 ppm to about 40,000 ppm, or from about 15,000 ppm to about 25,000 ppm. However, it is also contemplated that the permeated water may comprise other concentrations of total dissolved solutes.

Referring again to FIG. 1, the system may also comprise a membrane controller 16. The membrane controller 16 may comprise a programmable logic controller. The membrane controller 16 may be used to control, monitor, and record the operation of the diffusive membrane system. The membrane controller 16 may be programmed to selectively disengage and isolate at least one of the plurality of membrane banks 20 from the system. Referring again to FIG. 2, the membrane controller 16 may interact with a plurality of membrane valves 21 that are disposed upstream and downstream of each of the plurality of membrane banks 20. The membrane valves 21 may be similarly structure to the filter valves 19, and suitable to cut off fluid communication with the targeted membrane bank from the remainder of the system. Once triggered, the membrane controller 16 may send a signal to the plurality of valves, which close and isolate the targeted membrane bank 20 from fluid communication with the remainder of the system, preventing any contamination. Triggering steps may include exceeding a certain threshold of total dissolved solids, periodic backwash routines, or targeting a certain blended water concentration.

Referring again to FIG. 1, in another embodiment, the membrane controller 16 may be programmed to selectively disengage at least one of the plurality of membrane banks 20 if the corresponding membrane sensor 14 indicates a total dissolved solids level of greater than about 30,000 ppm. The membrane controller 16 may interact with the membrane sensors 14 positioned at the output of each of the plurality of membrane banks 20. If the membrane sensor 14 detects a total dissolved solids level of greater than a certain level, the membrane controller 16 may disengage the targeted membrane bank by engaging a plurality of membrane valves 21 that surround the targeted membrane bank and close the valves, to isolate the targeted membrane bank 20 from fluid communication with the remainder of the system. Accordingly, if a certain membrane bank is not operating properly, the membrane controller 16 may isolate it, while preserving the functionality of the rest of the system, thus allowing production to continue without interruption.

In other possible configurations, the membrane controller 16 is programmed to selectively disengage and isolate at least one of the plurality of membrane banks 20 from the system if the total dissolved solids level exceeds about 10,000 ppm, 20,000 ppm, 25,000 ppm, 35,000 ppm or 40,000 ppm. It is also contemplated that the membrane controller 16 may be operable to disengage at least one of the plurality of membrane banks 20 if the total dissolved solids level exceeds other thresholds programmed into the controller.

In another embodiment, the membrane controller may be programmed to selectively disengage and isolate at least one of the plurality of membrane banks from fluid communication with the system upon detection if the total dissolved solids level at the outlet of the membrane bank ranges from about 20,000 ppm to about 100,000 ppm, or about 30,000 ppm to about 50,000 ppm, or about 35,000 ppm to about 45,000 ppm. It may also range from about 20,000 ppm to about 40,000 ppm.

In another embodiment, the membrane controller 16 may be programmed to periodically shutdown at least one membrane bank 20, and direct a rinsing stream (not shown) to the disengaged membrane bank to provide backwashing to that membrane bank. It is also contemplated that other procedures may be completed when the at least one membrane bank is disengaged. The membrane controller 16 may be programmed to automatically shutdown at least one membrane bank on a regular time schedule in accordance with the needs of the particular application. In one configuration, the membrane controller 16 may shut down one bank per 6 hours, or 12 hours, or 18 hours, or 24 hours, or 48 hours. It is also contemplated that the membrane controller may be operable to shut down the membrane banks at other time intervals necessary for the particular application. In one configuration, the diffusive membrane system 12 operates at about 60% capacity because each series of membranes is backflushed about every 24 hours. However, the diffusive membrane system may also be designed to operate at about 50%, about 55%, about 65%, or about 70% capacity during backwashing steps. The backwashed solution may be redirected to the filtration system 10, diffusive membrane system 12, or both, or may be removed from the system for disposal.

Referring to FIG. 2, in one embodiment, a portion of the fractionated feed 5 may bypass the filtration system 10 and diffusive membrane system 12. The system may comprise a connection designed and configured to mix a bypass fractionated water 42 with the permeated water 34 produced by the diffusive membrane system 12 to produce a blended stream 38. The bypass fractionated water may be directed by a bypass valve (not shown) suitable to regulate and control the amount of flow that bypasses the filter and membrane systems, and is blended with the permeated water. The membrane controller 16 may be programmed to selectively disengage at least one of the plurality of membrane banks 20 to produce a blended stream 38 having a total dissolved solids level of less than about 20,000 ppm. The blended water comprises a mixture of fractionated water and permeated water that pass through both the filter and membrane systems. The flow rate of the bypassing fractionated water, and permeated water may be controlled to produce a blended water stream having the desired amount of total dissolved solids. The membrane controller may monitor the total dissolved solids levels of the bypass fractionated water 42, and selectively disengage at least one plurality of membrane banks to provide the blended stream 38 having the desired levels of total dissolved solids. The membrane controller 16 may also control and monitor the flow of the bypass fractionated water 42. In one configuration, the membrane controller 16 may disengage the flow of the bypass fractionated water 42.

The membrane controller 16 may be configured to selectively disengage at least one of the plurality of the membrane banks 20 to produce a blended stream 38 having a total dissolved solids level of less than about 20,000 ppm. In addition, the membrane controller 16 may be configured to selectively disengage at least one of the plurality of membrane banks 20 to produce a blended stream 38 having a total dissolved solids level less than about 30,000 ppm, less than about 20,000 ppm or less than about 50,000 ppm in the outlet stream. Alternatively, it is also contemplated that the membrane controller 16 may be configured to produce a blended stream 38 having other levels of total dissolved solids.

In another embodiment, the membrane controller may be programmed to selectively disengage at least one of the plurality of membrane banks to produce a blended water stream having a total dissolved solids level ranging from about 10,000 ppm to about 20,000 ppm, or about 20,000 ppm to about 30,000 ppm, or about 25,000 ppm to about 35,000 ppm, or about 20,000 ppm to about 40,000 ppm.

The blending of the fractionated water feed 5 with a selected amount of permeated water ensures an efficient treatment method that provides a treated water stream having a total dissolved solids level appropriate for the particular application. If a greater amount of total dissolved solids level can be tolerated in the blended stream 38 for either reuse or disposal, the membrane controller 16 disengages at least one membrane bank, and allows a predetermined amount of raw fractionated water to bypass the filtration and diffusive membrane systems to blend with the permeated water stream. If the tolerated level of total dissolved solids is very low, less raw fractionated water 5 may be blended with the permeated water 34. Thus, the present system and method provide a treatment system that adjusts to the needs of the particular application.

Referring to FIGS. 2A, 2C, and 2D, the system may also comprise a biocide dispenser 44 operable to kill algae and other organisms that may be present in the fractionated water. The biocide dispenser may be located at a variety of locations in the system, including but not limited to, before the pre-filter, before the filtration system 10, before the diffusive membrane system, or after the diffusive membrane system.

Figure 3:
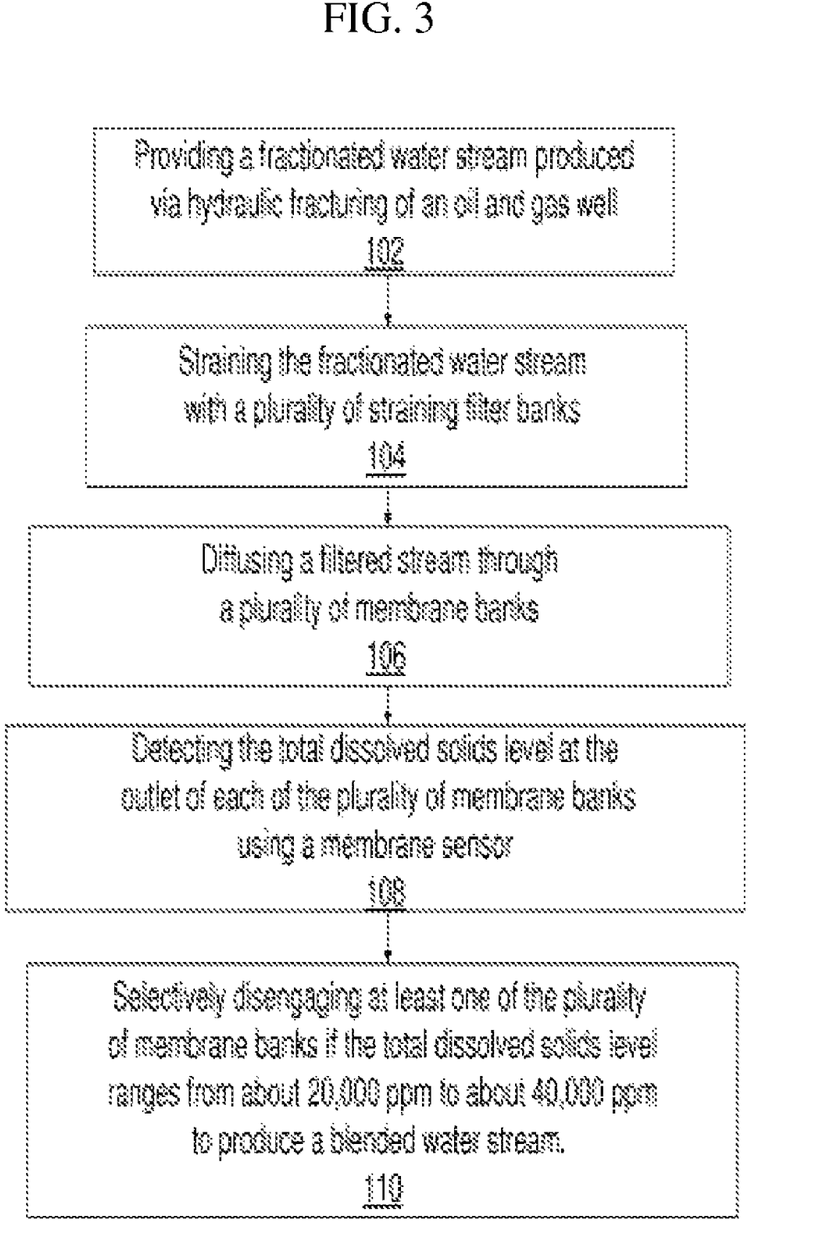
FIG. 3 shows a schematic of a water treatment method in accordance with another embodiment.

Referring to FIG. 3, in another embodiment, a method of treating fractionated water from an oil and gas well, the method comprising: providing a fractionated water stream produced via hydraulic fracturing of an oil and gas well (102). The method also comprises straining the fractionated water stream with a plurality of straining filter banks (104) and diffusing a filtered stream through a plurality of membrane banks (106). The method may also comprise detecting the total dissolved solids level at the outlet of each of the plurality of membrane banks using a membrane sensor (108); and selectively disengaging at least one of the plurality of membrane banks if the total dissolved solids level ranges from about 20,000 ppm to about 40,000 ppm to produce a blended water stream (110).

In yet another embodiment, a portable treatment system is provided. The portable treatment system may comprise a moveable vehicle comprising a support surface. The apparatus discussed throughout the above disclosure may be configured to be mounted on the support surface. The portable filtration system is sized to fit on a road trailer and comply with regulatory weight limits. Alternatively, the portable filtration system can be disposed on any portable surface, such as a moveable platform, truck, or trailer. Also, the recovery unit weighs less than the maximum weight limits tolerated by public roads, and may be transported on a road trailer or vehicle. For example, the treatment system described herein may weigh between 40000 lbs and 93000 lbs.

Various sizes are also contemplated for the treatment system. For example, the system may be sized to fit easily on mountain side mining sites. Moreover, the recovery unit may be sized to treat between about 100 barrels per day and about 5000 barrels per day or from about 200 to about 3000 barrels per day. In addition, it is also contemplated that the various capacities of the unit operations disclosed herein may be adjusted to achieve a desired production capacity.

For the purposes of describing and defining the present invention, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

It is also noted that recitations herein of "at least one" component, element, etc., should not be used to create an inference that the alternative use of the articles "a" or "an" should be limited to a single component, element, etc.

It is noted that recitations herein of a component of the present disclosure being "programmed" in a particular way, "configured" or "programmed" to embody a particular property, or function in a particular manner, are structural recitations, as opposed to recitations of intended use. More specifically, the references herein to the manner in which a component is "programmed" or "configured" denotes an existing physical condition of the component and, as such, is to be taken as a definite recitation of the structural characteristics of the component.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

For the purposes of describing and defining the present invention it is noted that the terms "substantially" and "approximately" are utilized herein to represent the inherent degree of uncertainty that may be attributed to any quantitative comparison, value, measurement, or other representation. The terms "substantially" and "approximately" are also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Rather, the claims appended hereto should be taken as the sole representation of the breadth of the present disclosure and the corresponding scope of the various inventions described herein. Further, it will be apparent that modifications and variations are possible without departing from the scope of the invention defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A system for treating fractionated water from an oil and gas well, the system comprising:
   a filter system, a diffusive membrane system, a plurality of membrane sensors, at least one membrane controller, and a connection, wherein the filter system is fluidly connected to the diffusive membrane system,
   wherein the filter system comprises a plurality of straining filter banks,
   wherein the diffusive membrane system comprises a plurality of membrane banks each having an inlet and an outlet,
   wherein the plurality of membrane sensors are positioned at the outlet of each of the plurality of membrane banks, and the plurality of membrane sensors are configured to detect the total dissolved solids level at the outlet of each of the plurality of membrane banks,
   wherein the at least one membrane controller is programmed to selectively disengage and isolate at least one of the plurality of membrane banks from fluid communication with the system upon detection if the total dissolved solids level at the outlet of one or more of the membrane banks is above about 20,000 ppm, and wherein the connection is configured to mix a bypassing fractionated water feed bypass with at least one permeated water stream from the plurality of membrane banks to produce a blended water stream having a total dissolved solids level ranging from about 20,000 ppm to about 30,000 ppm.

2. The system of claim 1, wherein the filter system further comprises a filter controller programmed to selectively disengage and isolate at least one of the plurality of straining filter banks.

3. The system of claim 1, wherein the plurality of straining filter banks each comprise a plurality of bag filters.

4. The system of claim 1, wherein the plurality of straining filter banks comprise a first straining filter bank, a second straining filter bank, and a third straining filter bank, wherein the first straining filter bank comprises a plurality of bag filters having a pore size ranging from about 10 microns to about 25 microns, wherein the second straining filter bank comprises a plurality of bag filters having a pore size ranging from above 0 microns to about 5 microns; and the third straining filter bank comprises a plurality of multiple layer bag filters having a pore size ranging from above 0 microns to about 5 microns, and wherein the second straining filter bank is disposed between the first and third straining filter bank.

5. The system of claim 1, wherein the plurality of straining filter banks comprise a first straining filter bank, a second straining filter bank, and a third straining filter bank, wherein the first straining filter bank comprises a plurality of bag filters, wherein the second straining filter bank comprises a plurality of bag filters; and the third straining filter bank comprises a plurality of multiple layer bag filters, and wherein the first straining filter bank comprises an output fluidly connected to the second straining filter bank, and wherein the second straining filter bank comprises an output fluidly connected to the third straining filter bank, wherein the filter system further comprises a filter controller wherein the filter controller is programmed to selectively disengage an at least one filter of a first straining filter bank, an at least one filter of a second straining filter bank, and an at least one filter of a third straining filter bank.

6. The system of claim 5, wherein the first straining filter bank comprises a plurality of bag filters having a pore size of about 10 microns, wherein the second straining filter bank comprises a plurality of bag filters having a pore size of about 5 microns, and wherein the third straining filter bank comprises a plurality of multiple layer bag filters having a pore size of about 1 microns.

7. The system of claim 1, wherein the plurality of membrane banks each comprise a plurality of reverse osmosis membranes.

8. The system of claim 1, wherein the membrane controller is programmed to selectively disengage and isolate at least one of the plurality of membrane banks from fluid communication with the system if the total dissolved solids level at the output of the membrane bank ranges from about 30,000 ppm to about 50,000 ppm.

9. The system of claim 1, wherein the fractionated water has a total dissolved solids level ranging from about 30,000 ppm to about 100,000 ppm.

10. A method of treating fractionated water from an oil and gas well, the method comprising:
   providing a fractionated water stream produced via hydraulic fracturing of an oil and gas well;
   straining the fractionated water stream with a plurality of straining filter banks;
   diffusing a filtered stream through a plurality of diffusive membrane banks;
   detecting the total dissolved solids level at the outlet of each of the plurality of membrane banks using a membrane sensor; and
   selectively disengaging at least one of the plurality of membrane banks if the total dissolved solids level ranges from about 20,000 ppm to about 40,000 ppm to produce a blended water stream, and
   mixing a bypassing fractionated water feed with at least one permeated water stream produced by the plurality of membrane banks to produce a blended water stream, wherein the membrane controller is programmed to selectively disengage at least one of the plurality of membrane banks to produce a blended water stream having a total dissolved solids level ranging from about 20,000 ppm to about 30,000 ppm.

11. The method of claim 10, further comprising selectively disengaging at least one of the plurality of membrane banks if the total dissolved solids level ranging from about 20,000 ppm to about 30,000 ppm.

12. The method of claim 10, wherein the plurality of filtration banks comprise a plurality of bag filters, the method further comprising selectively disengaging at least one filter from at least one straining filter bank.

13. The method of claim 10, wherein the plurality of straining filter banks comprise a first straining filter bank, a second straining filter bank, and a third straining filter bank, wherein the first straining filter bank comprises a plurality of bag filters having a pore size ranging from about 15 microns to about 30 microns, wherein the second straining filter bank comprises a plurality of bag filters having a pore size ranging from above 0 microns to above 5 microns; and the third straining filter bank comprises a plurality of multiple layer bag filters having a pore size ranging from above 0 microns to above 5 microns, and wherein the first straining filter bank comprises an output fluidly connected to the second straining filter bank, wherein the second straining filter bank comprises an output fluidly connected to the third straining filter bank.

14. The method of claim 10, wherein the fractionated water comprises water having a total dissolved solids level ranging from about 30,000 ppm to about 100,000 ppm.

15. The method of claim 10, wherein the fractionated water comprises water having a total dissolved solids level ranging from about 40,000 ppm to about 70,000 ppm.

16. A system for treating fractionated water from an oil and gas well, the system comprising:
   a filter system, a diffusive membrane system, a plurality of membrane sensors, and at least one membrane controller, wherein the filter system is fluidly connected to the diffusive membrane system,
   wherein the fractionated water comprises water having a total dissolved solids level ranging from about 30,000 ppm to about 100,000 ppm,
   wherein the filter system comprises a plurality of straining filter banks,
   wherein the plurality of straining filter banks each comprise a plurality of bag filters,
   wherein the diffusive membrane system comprises a plurality of membrane banks each having an inlet and an outlet, wherein the plurality of membrane banks each comprise a plurality of reverse osmosis membranes,
   wherein the plurality of membrane sensors are positioned at the outlet of each of the plurality of membrane banks, and the plurality of membrane sensors are configured to detect the total dissolved solids level at the outlet of each of the plurality of membrane banks,
   wherein the at least one membrane controller is programmed to selectively disengage and isolate at least one of the plurality of membrane banks from fluid communication with the system upon detection if the total dissolved solids level at the outlet of one or more of the membrane banks is above about 20,000 ppm,
   further comprising a connection configured to mix a bypassing fractionated water feed bypass with an at least one permeated water stream from the plurality of membrane banks to produce a blended water stream, wherein the membrane controller is programmed to selectively disengage at least one of the plurality of membrane banks to produce a blended water stream having a total dissolved solids level ranging from about 20,000 ppm to about 30,000 ppm.

17. The system of claim 16, wherein the plurality of straining filter banks comprise a first straining filter bank, a second straining filter bank, and a third straining filter bank, wherein the first straining filter bank comprises a plurality of bag filters having a pore size ranging from about 10 microns to about 25 microns, wherein the second straining filter bank comprises a plurality of bag filters having a pore size ranging from above 0 microns to about 5 microns; and the third straining filter bank comprises a plurality of multiple layer bag filters having a pore size ranging from above 0 microns to about 5 microns, and wherein the second straining filter bank is disposed between the first and third straining filter bank.

18. The system of claim 16, wherein the plurality of straining filter banks comprise a first straining filter bank, a second straining filter bank, and a third straining filter bank, wherein the first straining filter bank comprises a plurality of bag filters, wherein the second straining filter bank comprises a plurality of bag filters; and the third straining filter bank comprises a plurality of multiple layer bag filters, and wherein the first straining filter bank comprises an output fluidly connected to the second straining filter bank, and wherein the second straining filter bank comprises an output fluidly connected to the third straining filter bank, wherein the filter system further comprises a filter controller wherein the filter controller is programmed to selectively disengage an at least one filter of a first straining filter bank, an at least one filter of a second straining filter bank, and an at least one filter of a third straining filter bank.

* * * * *